US012566699B1

(12) United States Patent
Krishna et al.

(10) Patent No.: US 12,566,699 B1
(45) Date of Patent: Mar. 3, 2026

(54) ACTIVATING AUTOMATIC SLEEP AND WAKEUP SEQUENCES IN A NAND DIE BASED ON ANOTHER NAND DIE STATUS

(71) Applicant: Sandisk Technologies, Inc., Milpitas, CA (US)

(72) Inventors: Dharmaraju Marenahally Krishna, Bangalore (IN); Bhavadip Solanki, Bangalore (IN); Muralitharan Jayaraman, Bangalore (IN); Narendhiran Chinnaanangur Ravimohan, Bangalore (IN); Tanmai Kari, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 3 days.

(21) Appl. No.: 18/958,269

(22) Filed: Nov. 25, 2024

(51) Int. Cl.
*G06F 12/00* (2006.01)
*G06F 12/02* (2006.01)

(52) U.S. Cl.
CPC ................................. *G06F 12/0246* (2013.01)

(58) Field of Classification Search
CPC .. G06F 12/0246; G06F 1/3275; G06F 3/0611; G11C 5/148; G11C 5/147
USPC ........................................................ 711/103
See application file for complete search history.

(56) References Cited

U.S. PATENT DOCUMENTS

| | | | |
|---|---|---|---|
| 9,323,657 B1 | 4/2016 | Sela | |
| 11,397,460 B2 * | 7/2022 | Yang | G11C 16/26 |
| 11,398,258 B2 * | 7/2022 | Fisch | G11C 8/12 |
| 11,500,446 B2 * | 11/2022 | Fastow | G11C 5/144 |
| 11,520,696 B2 * | 12/2022 | Williams | G06F 12/0246 |
| 2017/0017409 A1 * | 1/2017 | Choi | G06F 12/0246 |
| 2023/0335165 A1 * | 10/2023 | Giduturi | G11C 5/148 |

* cited by examiner

*Primary Examiner* — Mardochee Chery
(74) *Attorney, Agent, or Firm* — Arlene Neal; NEAL BLIBO LLC

(57) ABSTRACT

A die on a memory device enters a wakeup or sleep state based on statuses of other dies on the memory device. The die includes an input/output (IO) line to indicate its operation state. A processor on the die obtains a wakeup interrupt die number and a sleep interrupt die number set by a storage device connected to the memory device. The processor receives a broadcast command including IO statuses for IO lines associated with the other dies on the memory device. The processor determines when an IO line for a second die associated with the wakeup interrupt die number transitions from a 1 state to a 0 state and executes a wakeup sequence. The processor also determines when an IO line for a third die associated with the sleep interrupt die number transitions from the 0 state to the 1 state and executes a sleep sequence.

20 Claims, 5 Drawing Sheets

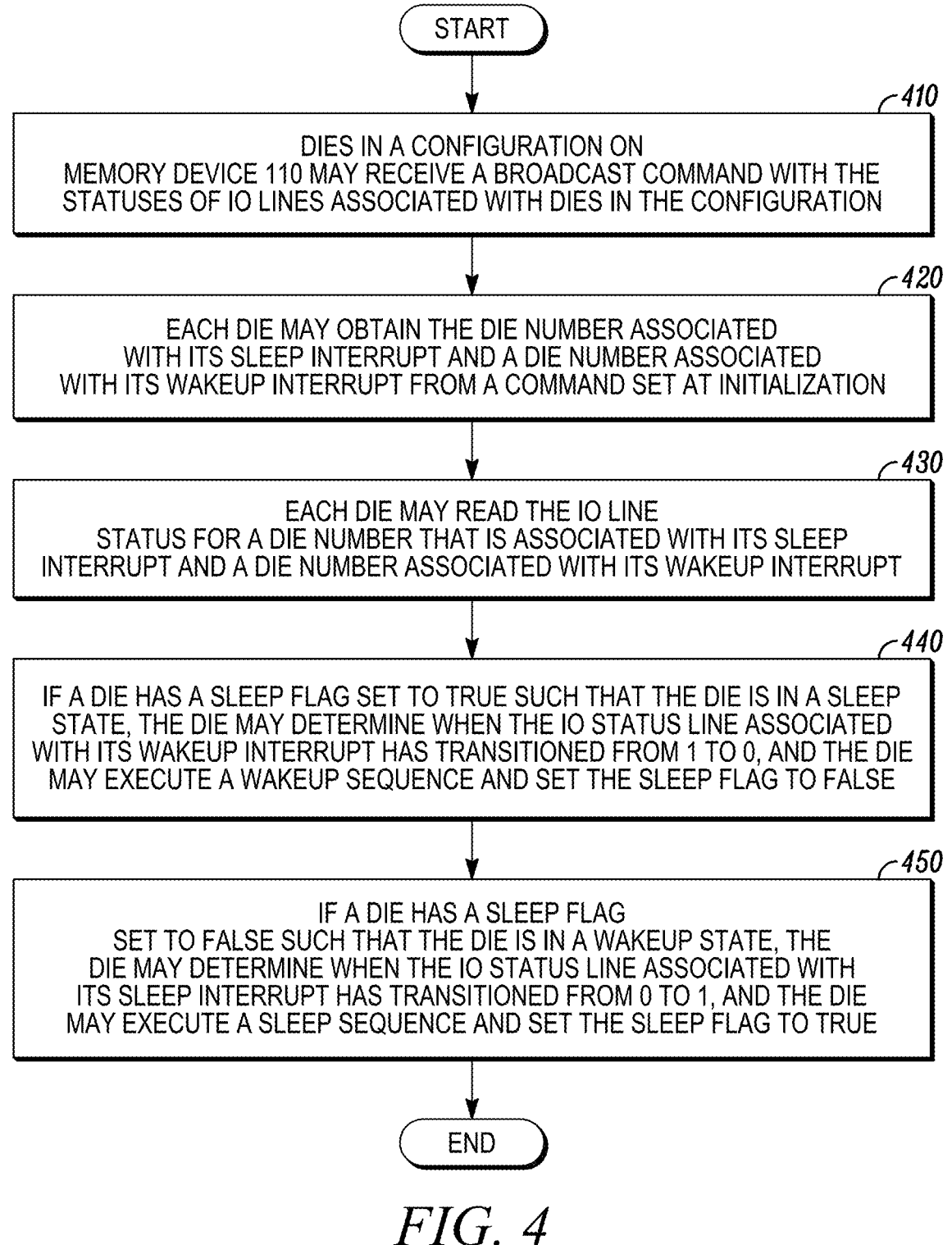

START

DIES IN A CONFIGURATION ON
MEMORY DEVICE 110 MAY RECEIVE A BROADCAST COMMAND WITH THE
STATUSES OF IO LINES ASSOCIATED WITH DIES IN THE CONFIGURATION
⟋410

EACH DIE MAY OBTAIN THE DIE NUMBER ASSOCIATED
WITH ITS SLEEP INTERRUPT AND A DIE NUMBER ASSOCIATED
WITH ITS WAKEUP INTERRUPT FROM A COMMAND SET AT INITIALIZATION
⟋420

EACH DIE MAY READ THE IO LINE
STATUS FOR A DIE NUMBER THAT IS ASSOCIATED WITH ITS SLEEP
INTERRUPT AND A DIE NUMBER ASSOCIATED WITH ITS WAKEUP INTERRUPT
⟋430

IF A DIE HAS A SLEEP FLAG SET TO TRUE SUCH THAT THE DIE IS IN A SLEEP
STATE, THE DIE MAY DETERMINE WHEN THE IO STATUS LINE ASSOCIATED
WITH ITS WAKEUP INTERRUPT HAS TRANSITIONED FROM 1 TO 0, AND THE DIE
MAY EXECUTE A WAKEUP SEQUENCE AND SET THE SLEEP FLAG TO FALSE
⟋440

IF A DIE HAS A SLEEP FLAG
SET TO FALSE SUCH THAT THE DIE IS IN A WAKEUP STATE, THE
DIE MAY DETERMINE WHEN THE IO STATUS LINE ASSOCIATED WITH
ITS SLEEP INTERRUPT HAS TRANSITIONED FROM 0 TO 1, AND THE DIE
MAY EXECUTE A SLEEP SEQUENCE AND SET THE SLEEP FLAG TO TRUE
⟋450

END

*FIG. 4*

ACTIVATING AUTOMATIC SLEEP AND WAKEUP SEQUENCES IN A NAND DIE BASED ON ANOTHER NAND DIE STATUS

BACKGROUND OF THE INVENTION

A storage device may be communicatively coupled to a host and to non-volatile/persistent memory including, for example, a NAND flash memory device on which the storage device may store data received from the host. The memory device may include multiple dies which may be divided into physical blocks and the storage device may store data in blocks on the memory device. The dies on the memory device may share a common input/output (IO) line, and as such, data may only be written to one die at a time. Consider an example where the memory device includes four dies. The data may be written in a circular fashion to die 0, and then die 1, and then die 2, and then die 3, and then die 0, and so on.

The storage device and the memory device may consume power provided by the host and the current consumption (including, for example, peak current or surge current) may be critical as the capacity of the storage device increases. Leakage current (i.e., current being provided to the dies that are not currently written to) may not be accounted for during the power calculation for the storage device and/or memory device. Therefore, as the number of dies in a memory device configuration increases, the leakage current may accumulate, possibly making a difference in the peak current which may result in surge current that may damage the host. To avoid being damaged by surge current, the host may cut off power to the storage device and possibly cause data integrity and performance issues on the storage device.

The storage device may include a controller to manage it operations. The controller may avoid current leakage by turning off chip enable (i.e., a control input to an integrated circuit (IC) that allows a chip to operate) or by manually issuing sleep and wakeup commands to dies configured to operate on the memory device. Using the example where the memory device includes four dies, to ensure that the other dies do not consume power when the data is being written to die 0, the controller may issue a command to each of dies 1-3 to place those dies in a sleep state. When the data is being written to die 1, the controller may place die 1 in a wakeup state and place dies 0, 2, and 3 in the sleep state, when the data is being written to die 2, the controller may place die 2 in a wakeup state and place dies 0, 1, and 3 in the sleep state, and so on. Having the controller monitor which die is being written to at a particular time to place that die in a wakeup state and place the other dies in the sleep state may add overhead to the storage device and impact the performance of the storage device.

SUMMARY OF THE INVENTION

In some implementations, a memory device may execute a wakeup sequence and a sleep sequence to place a first die on the memory device in a wakeup state or a sleep state based on statuses of other dies on the memory device. The memory device may include multiple dies and input/output (IO) lines associated with the dies. The first die may include a first processor to obtain a wakeup interrupt die number and a sleep interrupt die number set by a storage device communicatively coupled with the memory device. The first processor may receive a broadcast command including IO statuses for IO lines associated with the dies. The first processor may determine when an IO line for a second die associated with the wakeup interrupt die number for the first die transitions from a 1 state to a 0 state and execute a wakeup sequence. The first processor may determine when an IO line for a third die associated with the sleep interrupt die number for the first die transitions from the 0 state to the 1 state and execute a sleep sequence.

In some implementations, a method is provided on the memory device including multiple dies for executing a wakeup sequence and a sleep sequence to place a first die on the memory device in a wakeup state or a sleep state based on statuses of other dies on the memory device. The method includes obtaining, by a first processor in the first die, a wakeup interrupt die number and a sleep interrupt die number set by a storage device communicatively coupled with the memory device. The method also includes receiving, by the first processor, a broadcast command including IO statuses for IO lines associated with the dies. The method further includes determining, by the first processor, when an IO line for a second die associated with the wakeup interrupt die number for the first die transitions from a 1 state to a 0 state and executing a wakeup sequence. The method also includes determining, by the first processor, when an IO line for a third die associated with the sleep interrupt die number for the first die transitions from the 0 state to the 1 state and executing a sleep sequence.

In some implementations, a die on a memory device may execute a wakeup sequence and a sleep sequence to place the die in a wakeup state or a sleep state based on statuses of other dies on the memory device. The die may include an input/output (IO) line to indicate an operation state of the die. A processor on the die may obtain a wakeup interrupt die number and a sleep interrupt die number set by a storage device communicatively coupled with the memory device. The processor may receive a broadcast command including IO statuses for IO lines associated with the other dies on the memory device. The processor may determine when an IO line for a second die associated with the wakeup interrupt die number transitions from a 1 state to a 0 state and execute a wakeup sequence. The processor may also determine when an IO line for a third die associated with the sleep interrupt die number transitions from the 0 state to the 1 state and execute a sleep sequence.

BRIEF DESCRIPTION OF THE DRAWINGS

FIG. 4 is an example flow diagram for automatically transitioning between a sleep state and a wakeup state by dies on a memory device in accordance with some implementations.

Figure 1:
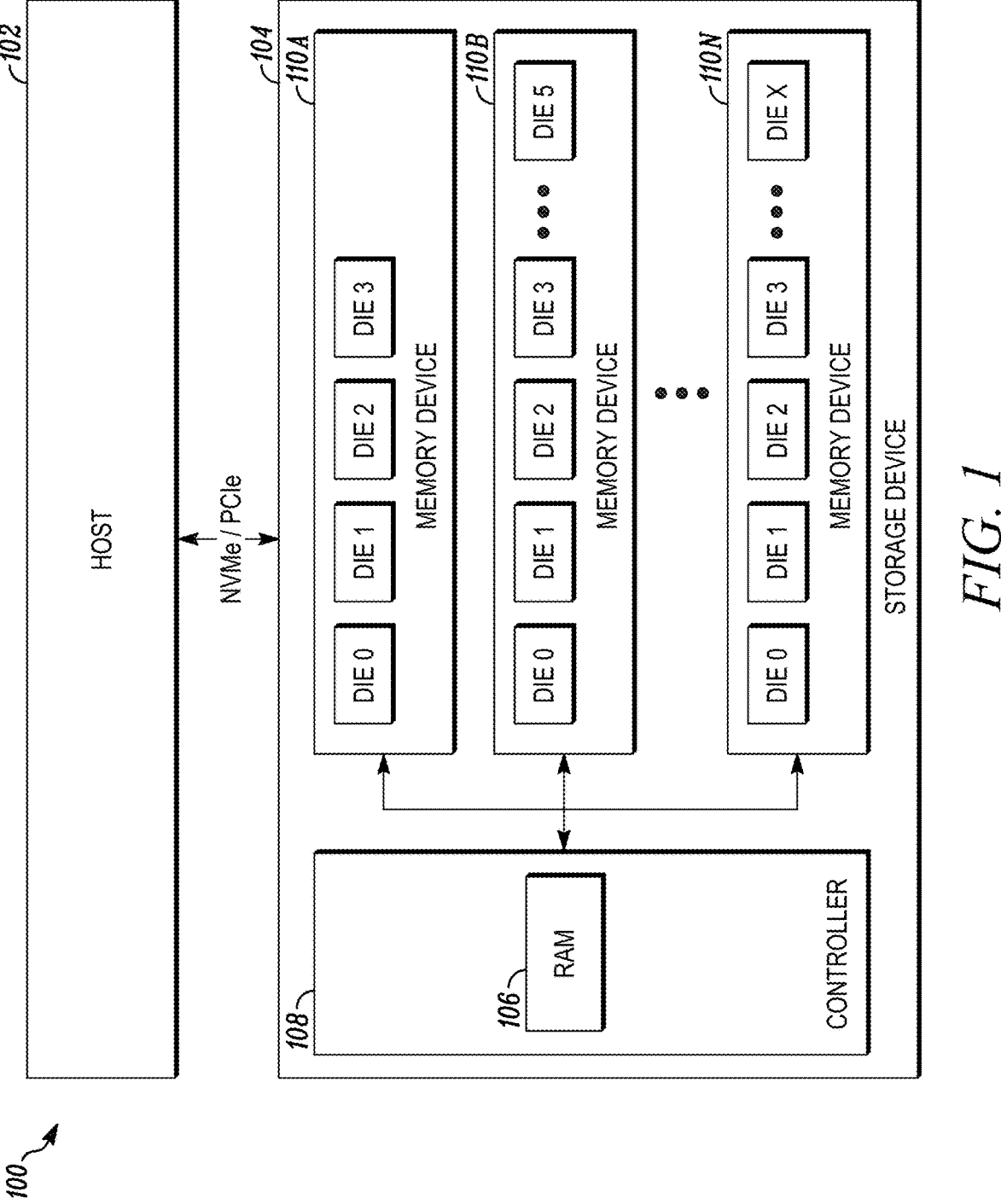
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Storage device 104 may communicate with host 102 via a Non-Volatile Memory Express (NVMe) protocol over a peripheral component interconnect express (PCIe) interface, and the like. Host 102 may include additional components (not shown in this figure for the sake of simplicity).

Storage device 104 may include a random-access memory (RAM) 106, a controller 108, and one or more non-volatile memory devices 110a-110n (referred to herein as the memory device(s) 110). Storage device 104 may be, for example, a solid-state drive (SSD). RAM 106 may be, for example, static RAM (SRAM) or dynamic RAM (DRAM) that be used to temporarily store data on storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include multiple dies (for example, DIE 0-DIE X) for storing the data. Memory device 110 may be included in storage device 104 or may be otherwise communicatively coupled to storage device 104.

During initialization or when firmware is being downloaded on storage device 104, controller 108 may execute a set feature command. As part of the set feature command, controller 108 may provide a die sequence to identify how data may be stored on dies on a memory device 110. For example, if memory device 110A includes four dies, i.e., DIE 0 to DIE 3, controller 108 may set the die sequence such that data may be written to DIE 0, then DIE 1, then DIE 2, then DIE 3. In another example, if memory device 110B includes six dies, i.e., DIE 0 to DIE 5, controller 108 may set the die sequence such that data may be written to DIE 0, then DIE 2, then DIE 4, then DIE 1, then DIE 3, and then DIE 5. As such, controller may provide any die sequence in the set feature command.

Controller 108 may use the set feature command to store a wakeup interrupt die number and a sleep interrupt die number for each die in a die configuration/stack on memory device 110. The wakeup interrupt die number may be used as input for a die (referred to herein as a first die) to determine when to execute a wakeup sequence and operate in a wakeup state and the sleep interrupt die number may be used as input for the first die to determine when to execute a sleep sequence and operate in a sleep state. Using the example where memory device 110A includes four dies, the set feature command may include a wakeup interrupt die number and a sleep interrupt die number for each of DIE 0 to DIE 3, wherein each of DIE 0 to DIE 3 may use its wakeup interrupt die number and sleep interrupt die number to determine whether to operate in a sleep state or a wakeup state.

For example, when DIE 1 is the first die, controller 108 may use the set feature command to set DIE 0 as the wakeup interrupt die number (i.e., the second die) to cause DIE 1 (the first die) to operate in a wakeup state; when DIE 2 is the first die, controller 108 may use the set feature command to set DIE 1 as the wakeup interrupt die number (i.e., the second die) to cause DIE 2 (the first die) to operate in a wakeup state; when DIE 3 is the first die, controller 108 may use the set feature command to set DIE 2 as the wakeup interrupt die number (i.e., the second die) to cause DIE 3 (the first die) to operate in a wakeup state; and when DIE 0 is the first die, controller 108 may use the set feature command to set DIE 3 as the wakeup interrupt die number (i.e., the second die) to cause DIE 0 (the first die) to operate in a wakeup state.

When DIE 0 is the first die, controller 108 may also use the set feature command to set DIE 1 as the sleep interrupt die number (i.e., the third die) to cause DIE 0 (the first die) to operate in a sleep state; when DIE 1 is the first die, controller 108 may use the set feature command to set DIE 2 as the sleep interrupt die number (i.e., the third die) to cause DIE 1 (the first die) to operate in a sleep state; when DIE 2 is the first die, controller 108 may use the set feature command to set DIE 3 as the sleep interrupt die number (i.e., the third die) to cause DIE 2 (the first die) to operate in a sleep state; and when DIE 3 is the first die, controller 108 may use the set feature command to set DIE 0 as the sleep interrupt die number (i.e., the third die) to cause DIE 3 (the first die) to operate in a sleep state. At initialization as part of the set feature command, controller 108 may then set each of DIES 0-3 to operate in a sleep state.

When controller 108 writes data to memory device 110A, controller 108 may write data on DIES 0-3 in an interleave manner wherein data may be written, for example, to a block in DIE 0, then a block in DIE 1, then a block in DIE 2, then a block in DIE 3, then a block in DIE 0, and so on. To prevent current leakage such that the dies that are not being written to may remain in the sleep state and not draw power from host 102, controller 108 may periodically issue a broadcast command to the NAND die stacks. For example, controller 108 may periodically issue a 79H command, to the die stack in memory device 110A, i.e., the die configuration including DIES 0-3. The broadcast command may include multiple input/output (IO) lines, wherein one IO line may be associated with a die in the stack. For example, IO line 0 may be associated with DIE 0, IO line 1 may be associated with DIE 1, IO line 2 may be associated with DIE 2, and IO line 3 may be associated with DIE 3. When controller 108 is writing data to a die in the stack, the IO line associated with that die may be in a 1 state and the IO lines associated with dies that are not being written to may be in a 0 state.

Using the example of memory device 110A where die sequence provided in the set feature command indicates that data may be written in sequence to DIE 0, DIE 1, DIE 2, DIE 3, DIE 0, and on so, when controller 108 sends data to DIE 0, the IO line for DIE 0 may be in a 1 state and the IO lines for DIEs 1-3 may be in a 0 state. When controller 108 sends data to DIE 1, the IO line for DIE 1 may be in a 1 state and the IO lines for DIEs 0, 2, and 3 may be in a 0 state, when controller 108 sends data to DIE 2, the IO line for DIE 2 may be in a 1 state and the IO lines for DIEs 0, 1, and 3 may be in a 0 state, and so on.

When an IO line transitions from 1 to 0, the die associated with that IO line may move to a sleep state. When an IO line transitions from 0 to 1, the die associated with that IO line may move to a wakeup state. Each of DIES 0-3 may include a processor that may use the information in the broadcast command to determine whether to put the die in a sleep or wakeup state.

As controller 108 transitions from sending data from, for example, DIE 0 to sending data to DIE 1, IO line 0 (i.e., the IO line associated with DIE 0) may transition from 1 to 0 and the broadcast command may show that IO line 0 has transitioned from 1 to 0. The processor in DIE 1 (in this case the first die) may determine that DIE 0 (in this case the second die) is set as the wakeup interrupt die number for DIE 1. As such, when the processor in DIE 1 (referred to herein as a first processor) identifies that IO line 0 has transitioned from 1 to 0, the processor in DIE 1 may move the IO line for DIE 1 from 0 to 1, execute a wakeup sequence, and set a sleep flag to false, causing DIE 1 to operate in a wakeup state. When the IO line for DIE 1 changes from 0 to 1, the processor in DIE 0 (referred to herein as a second processor) may determine that DIE 1 is the sleep interrupt die number for DIE 0 and the processor in DIE 0 may execute a sleep sequence in DIE 0 to place DIE 0 in the sleep state. The processor in DIE 0 may set a sleep flag in DIE 0 to true.

Similarly, as controller 108 transitions from sending data from, for example, DIE 1 to sending data to DIE 2, IO line 1 may transition from 1 to 0 and the broadcast command may show that IO line 1 has transitioned from 1 to 0. The processor in DIE 2 (now the first die) may determine that DIE 1 (now the second die) is set as the wakeup interrupt die number for DIE 2 to transition to a wakeup state. As such, the processor in DIE 2 (first processor) may move the IO line for DIE 2 from 0 to 1, execute a wakeup sequence, and set a sleep flag to false, causing DIE 2 to operate in a wakeup state. When the IO line for DIE 2 changes from 0 to 1, the processor in DIE 1 (second processor) may determine that DIE 2 is the sleep interrupt die number for DIE 1 and the processor in DIE 1 may execute a sleep sequence in DIE 1 to place DIE 1 in the sleep state. The processor in DIE 1 may set a sleep flag in DIE 1 to true.

Using the wakeup interrupt die number and sleep interrupt die number provided in the set feature command and the IO line statuses, the processor in each die may determine whether to operate in a sleep state or a wakeup state. Hence, the process for moving each of DIES 0-3 between a sleep state and a wakeup state may be managed internally on the die. The automatic execution of the sleep/wakeup sequence by the dies, without further instruction from controller 108, may minimize overhead on storage device 104 while avoiding leakage current and/or surge current which may damage host 102.

Memory device 110 may perform these processes based on processor(s) executing software instructions stored by a non-transitory computer-readable medium, such as memory device 110. As used herein, the term "computer-readable medium" refers to a non-transitory memory device. Software instructions may be read into memory device 110 from another computer-readable medium or from another device.

When executed, software instructions stored in memory device 110 may cause the processors to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
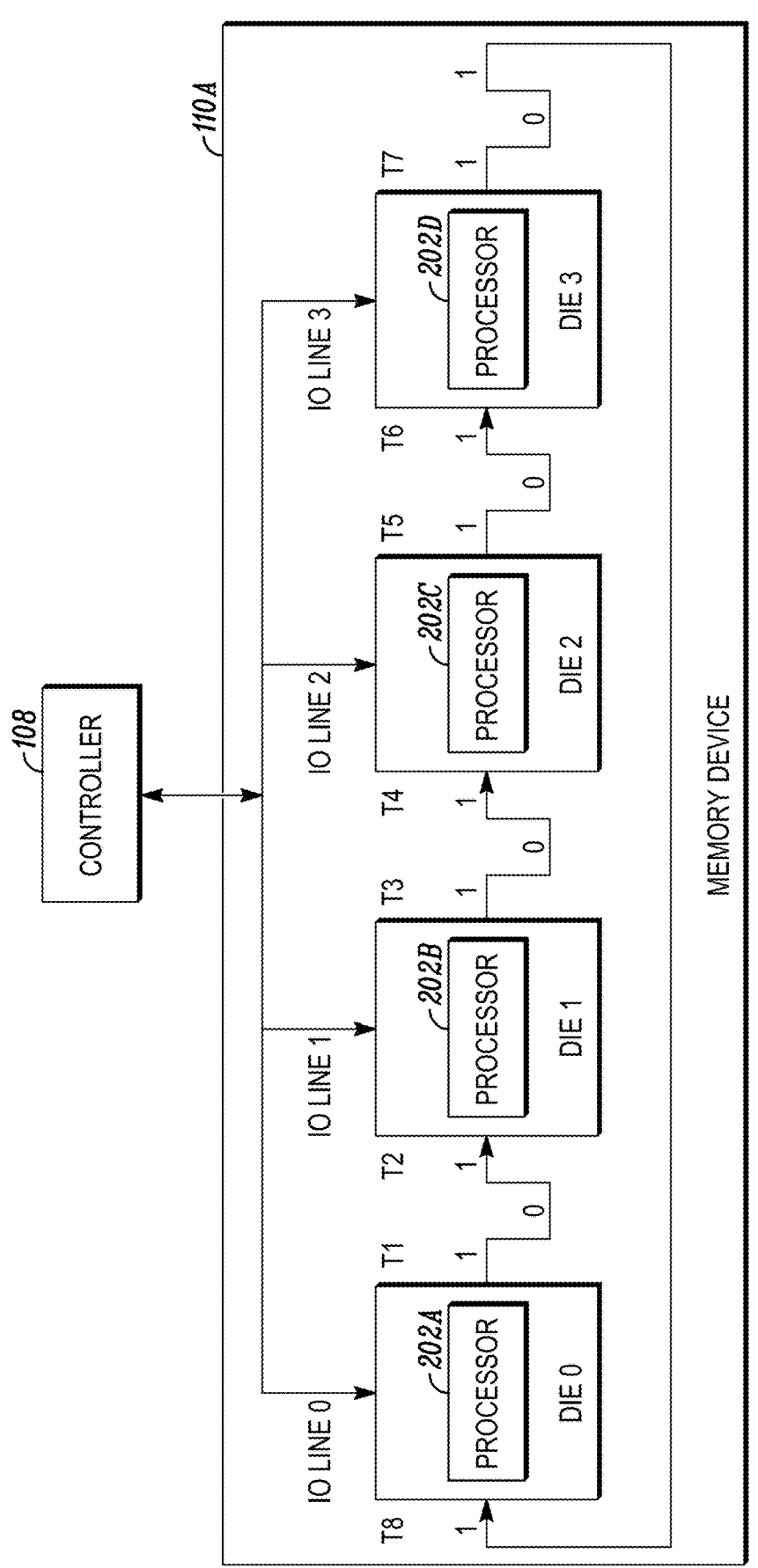
FIG. 2 is an example block diagram showing how dies configured on a memory device may automatically transition to a wakeup state in accordance with some implementations.

FIG. 2 is an example block diagram showing how dies configured on a memory device may automatically transition to a wakeup state in accordance with some implementations. Each of DIES 0-3 in, for example, memory device 110A, may send its IO status on an IO line associated with the die to controller 108. For example, DIE 0 may send its IO status on IO line 0, DIE 1 may send its IO status on IO line 1, DIE 2 may send its IO status on IO line 2, and DIE 3 may send its IO status on IO line 3. Controller 108 may set the wakeup interrupt die number for each die at initialization. For example, controller 108 may set DIE 0 as the wakeup interrupt die number for DIE 1 such that when DIE 0 transitions from 1 to 0, the transition on the IO line 0 may cause processor 202B in DIE 1 to execute a wakeup sequence for DIE 1 to operate in a wakeup state; controller 108 may set DIE 1 as the wakeup interrupt die number for DIE 2 such that when DIE 1 transitions from 1 to 0, the transition on the IO line 1 may cause processor 202C in DIE 2 to execute a wakeup sequence for DIE 2 to operate in a wakeup state; controller 108 may set DIE 2 as the wakeup interrupt die number for DIE 3 such that when DIE 2 transitions from 1 to 0, the transition on the IO line 2 may cause processor 202D in DIE 3 to execute a wakeup sequence for DIE 3 to operate in a wakeup state; and controller 108 may set DIE 3 as the wakeup interrupt die number for DIE 0 such that when DIE 3 transitions from 1 to 0, the transition on the IO line 3 may cause processor 202A in DIE 0 to execute a wakeup sequence for DIE 0 to operate in a wakeup state.

Controller 108 may periodically broadcast the IO statuses to DIES 0-3 in a die stack on memory device 110. At time T1, when data is being written to DIE 0, IO line 0 may have a 1 status and when the write operation completes, IO line 0 may transition to a 0 status. The lines into and out of each die are meant to show the IO status of the IO line associated with the die. DIE 0 may send its IO status to controller 108 when it transitions from 1 to 0. At time T2, when DIE 1 receives the broadcast command from controller 108, processor 202B in DIE 1 may determine that DIE 0 is set as the wakeup interrupt die number for DIE 1 when DIE 1 is in a sleep state to cause DIE 1 to exit the sleep state. As such, processor 202B in DIE 1 may use the broadcast command to determine whether IO line 0 which is associated with DIE 0 has transitioned from 1 to 0. At T2 when processor 202B determines that IO line 0, has transitioned from 1 to 0, processor 202B in DIE 1 may execute a wakeup sequence and exit the sleep state, wherein IO line 1 associated with DIE 1 may transition from 0 to 1. At time T3, when the write operation on DIE 1 completes, IO line 1 may transition to 0. DIE 1 may send its IO status to controller 108 when it transitions from 1 to 0.

At time T4, when DIE 2 receives the broadcast command from controller 108, processor 202C in DIE 2 may determine that DIE 1 is set as the wakeup interrupt die number for DIE 2 to cause DIE 2 to exit the sleep state. As such, processor 202C in DIE 2 may use the broadcast command to determine whether IO line 1 which is associated with DIE 1 has transitioned from 1 to 0. When processor 202C determines that IO line 1, has transitioned from 1 to 0, processor 202C in DIE 2 may execute a wakeup sequence and exit the sleep state. IO line 2 associated with DIE 2 may transition from 0 to 1. At time T5, when the write operation on DIE 2 completes, IO line 2 may transition to 0. DIE 2 may send its IO status to controller 108 when it transitions from 1 to 0.

At time T6, when DIE 3 receives the broadcast command from controller 108, processor 202D in DIE 3 may determine that DIE 2 is set as the wakeup interrupt die number for DIE 3 to cause DIE 3 to exit the sleep state. As such, processor 202D in DIE 3 may use the broadcast command to determine whether IO line 2 which is associated with DIE 2 has transitioned from 1 to 0. When processor 202D determines that IO line 2, has transitioned from 1 to 0, processor 202D in DIE 3 may execute a wakeup sequence and exit the sleep state. IO line 3 associated with DIE 3 may transition from 0 to 1. At time T7, when the write operation on DIE 3 completes, IO line 3 may transition to 0. DIE 3 may send its IO status to controller 108 when it transitions from 1 to 0.

At time T8, when DIE 0 receives the broadcast command from controller 108, processor 202A in DIE 0 may determine that DIE 3 as the wakeup interrupt die number for DIE 0 to cause DIE 0 to exit the sleep state. As such, processor 202A in DIE 0 may use the broadcast command to determine whether IO line 3 which is associated with DIE 3 has transitioned from 1 to 0. When processor 202A determines that IO line 3, has transitioned from 1 to 0, processor 202A in DIE 0 may execute a wakeup sequence and exit the sleep state. IO line 0 associated with DIE 0 may transition from 0 to 1. The process may repeat from T1 to T8 while data is being written to memory device 110A. As indicated above FIG. 2 is provided as an example. Other examples may differ from what is described in FIG. 2.

Figure 3:
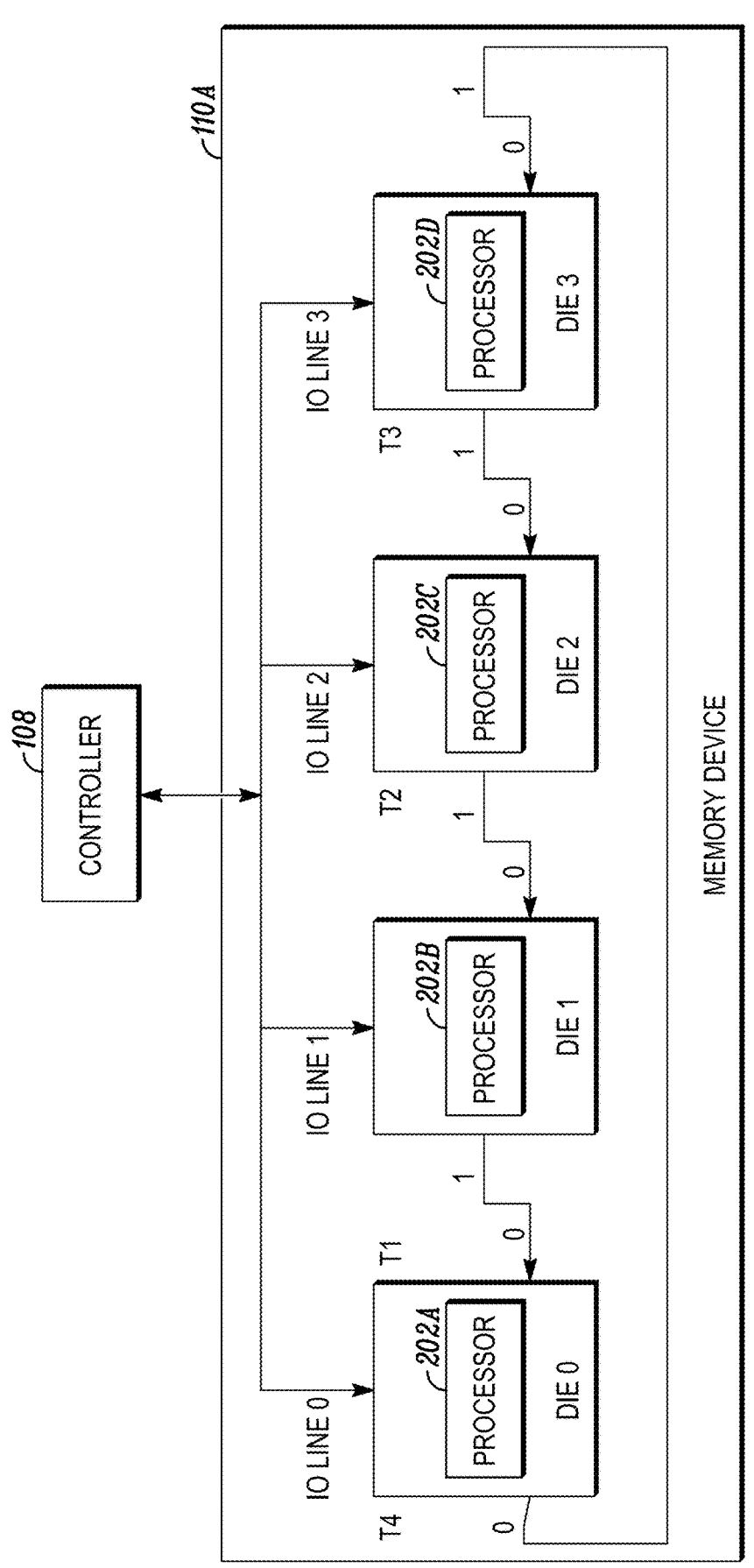
FIG. 3 is an example block diagram showing how dies configured on a memory device may automatically transition to a sleep state in accordance with some implementations.

FIG. 3 is an example block diagram showing how dies configured on a memory device may automatically transition to a sleep state in accordance with some implementations. Controller 108 may set the sleep interrupt die number for each die at initialization. For example, controller 108 may set DIE 1 as the sleep interrupt die number for DIE 0 such that when DIE 1 transitions from 0 to 1, the transition on the IO line 1 may cause processor 202A in DIE 0 to execute a sleep sequence for DIE 0 to operate in a sleep state; controller 108 may set DIE 2 as the sleep interrupt die number for DIE 1 such that when DIE 2 transitions from 0 to 1, the transition on the IO line 2 may cause processor 202B in DIE 1 to execute a sleep sequence for DIE 1 to operate in a sleep state; controller 108 may set DIE 3 as the sleep interrupt die number for DIE 2 such that when DIE 3 transitions from 0 to 1, the transition on the IO line 3 may cause processor 202C in DIE 2 to execute a sleep sequence for DIE 2 to operate in a sleep state; and controller 108 may set DIE 0 as the sleep interrupt die number for DIE 3 such that when DIE 0 transitions from 0 to 1, the transition on the IO line 0 may cause processor 202D in DIE 3 to execute a sleep sequence for DIE 3 to operate in a sleep state.

At time T1, when data is being written to DIE 1, IO line 1 may transition from 0 to 1, the transition on the IO line 1 may cause processor 202A in DIE 0 to execute a sleep sequence for DIE 0 to operate in a sleep state. At T2, when data is being written to DIE 2, IO line 2 may transition from 0 to 1, the transition on the IO line 2 may cause processor 202B in DIE 1 to execute a sleep sequence for DIE 1 to operate in a sleep state. At T3, when data is being written to DIE 3, IO line 3 may transition from 0 to 1, the transition on the IO line 3 may cause processor 202C in DIE 2 to execute a sleep sequence for DIE 2 to operate in a sleep state. At T4, when data is being written to DIE 0, IO line 0 may transition from 0 to 1, the transition on the IO line 0 may cause processor 202D in DIE 3 to execute a sleep sequence for DIE 3 to operate in a sleep state. As indicated above FIG. 3 is provided as an example. Other examples may differ from what is described in FIG. 3.

FIG. 4 is an example flow diagram for automatically transitioning between a sleep state and a wakeup state by dies on a memory device in accordance with some implementations. At 410, dies in a configuration on memory device 110 may receive a broadcast command with the statuses of IO lines associated with dies in the configuration. At 420, each die may obtain the die number associated with its sleep interrupt and a die number associated with its wakeup interrupt from a command set at initialization. At 430, each die may read the IO line status for a die number that is associated with its sleep interrupt and a die number associated with its wakeup interrupt. At 440, if a die has a sleep flag set to true such that the die is in a sleep state, the die may determine when the IO status line associated with its wakeup interrupt has transitioned from 1 to 0, and the die may execute a wakeup sequence and set the sleep flag to false. At 450, if a die has a sleep flag set to false such that the die is in a wakeup state, the die may determine when the IO status line associated with its sleep interrupt has transitioned from 0 to 1, and the die may execute a sleep sequence and set the sleep flag to true. As indicated above FIG. 4 is provided as an example. Other examples may differ from what is described in FIG. 4.

Figure 5:
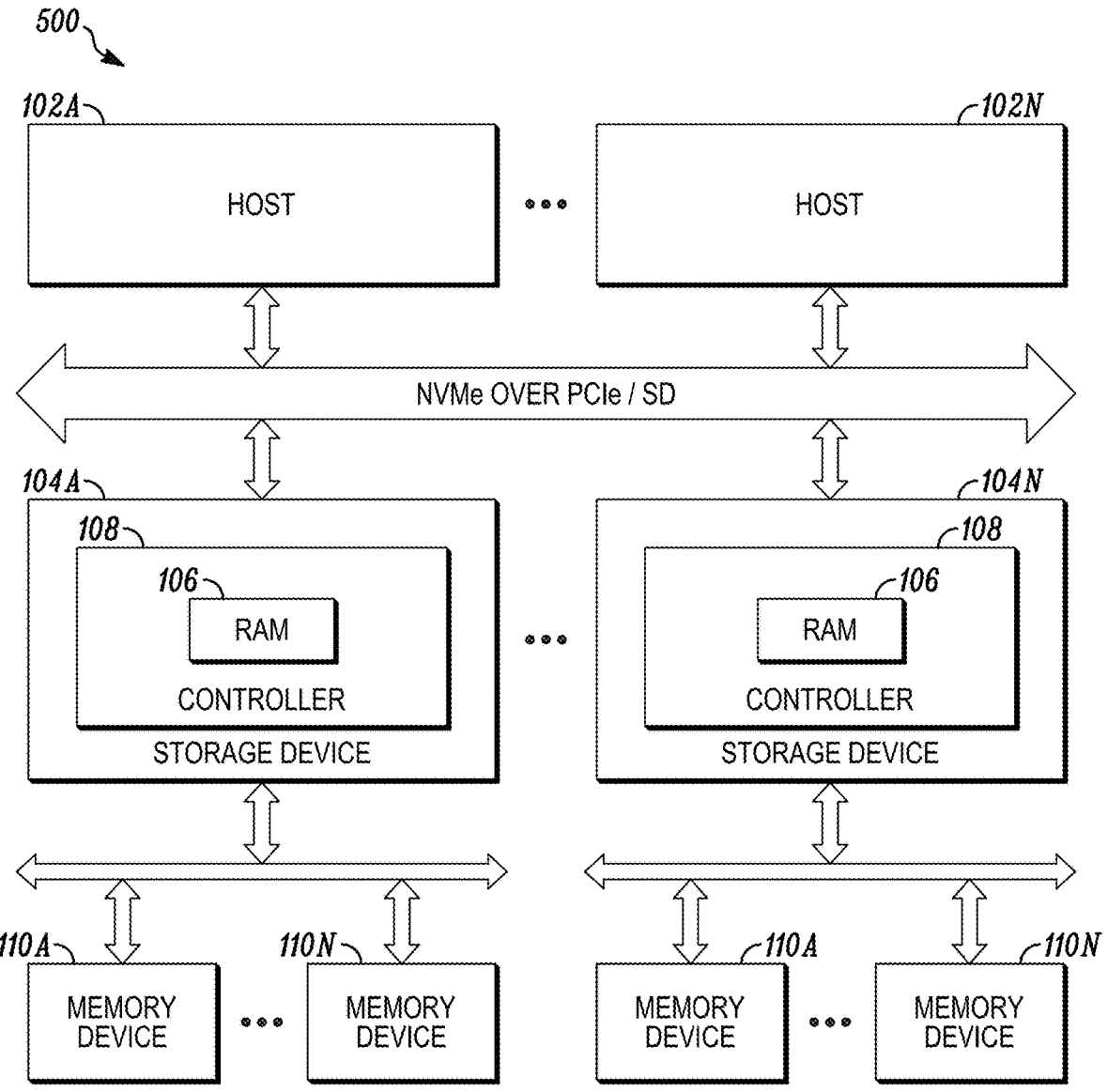
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102n (referred to herein as host(s) 102), and one or more storage devices 104a-104n (referred to herein as storage device(s) 104). A die in memory device 110 may include a processor to transition the die from a sleep state to a wakeup state, and vice versa, based on the statuses of other dies on memory device 110. Hosts 102 and storage devices 104 may communicate via Non-Volatile Memory Express (NVMe) over peripheral component interconnect express (PCI Express or PCIe), SD, or the like.

Devices of Environment 500 may interconnect via wired connections, wireless connections, or a combination of wired and wireless connections. For example, the network in FIG. 5 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A memory device to execute a wakeup sequence and a sleep sequence to place a first die on the memory device in one of a wakeup state and a sleep state based on statuses of other dies on the memory device, the memory device comprises:

a plurality of dies;

input/output (IO) lines associated with the plurality of dies; and a first processor in the first die to obtain a wakeup interrupt die number and a sleep interrupt die number set by a storage device communicatively coupled with the memory device, to receive a broadcast command including IO statuses for IO lines associated with the plurality of dies, to determine when an IO line for a second die associated with the wakeup interrupt die number for the first die transitions from a 1 state to a 0 state and execute a wakeup sequence, and to determine when an IO line for a third die associated with the sleep interrupt die number for the first die transitions from the 0 state to the 1 state and execute a sleep sequence.

2. The memory device of claim 1, wherein during initialization of the memory device, a controller on the storage device provides a die sequence to identify how data is to be stored on the dies on the memory device.

3. The memory device of claim 1, wherein during initialization of the memory device, a controller on the storage device provides the wakeup interrupt die number, and the sleep interrupt die number for dies on the memory device.

4. The memory device of claim 1, wherein the first processor uses IO line status associated with the wakeup interrupt die number to determine when to execute the wakeup sequence and operate in a wakeup state and uses IO line status associated with the sleep interrupt die number to determine when to execute the sleep sequence and operate in a sleep state.

5. The memory device of claim 1, wherein at initialization, the plurality of dies is set to the sleep state.

6. The memory device of claim 1, wherein when data is being written to the first die, an IO line associated with the first die is in the 1 state and when a write operation on the first die completes, the IO line associated with the first die transitions from the 1 state to the 0 state.

7. The memory device of claim 1, wherein when data is being written to the first die, the IO lines associated with other dies on the memory device are in the 0 state.

8. The memory device of claim 1, wherein when an IO line transitions from the 1 state to the 0 state, the die associated with that IO line is used as the wakeup interrupt die number for another die.

9. The memory device of claim 1, wherein when an IO line transitions from the 0 state to the 1 state, the die associated with that IO line is used as the sleep interrupt die number for another die.

10. The memory device of claim 1, wherein when the first processor executes the wakeup sequence, the first processor moves an IO line for the first die from the 0 state to the 1 state and sets a sleep flag to false.

11. The memory device of claim 1, wherein when an IO line for the first die moves from the 0 state to the 1 state, a second processor in the second die determines that the first die is the sleep interrupt die number for the second die and the second processor executes the sleep sequence and sets a sleep flag in the second die to true.

12. A method in a memory device including a plurality of dies for executing a wakeup sequence and a sleep sequence to place a first die on the memory device in one of a wakeup state and a sleep state based on statuses of other dies on the memory device, the memory device comprises a first processor in the first die to execute the method comprising:

obtaining a wakeup interrupt die number and a sleep interrupt die number set by a storage device communicatively coupled with the memory device;

receiving a broadcast command including input/output (IO) statuses for IO lines associated with the plurality of dies;

determining when an IO line for a second die associated with the wakeup interrupt die number for the first die transitions from a 1 state to a 0 state and executing a wakeup sequence; and determining when an IO line for a third die associated with the sleep interrupt die number for the first die transitions from the 0 state to the 1 state and executing a sleep sequence.

13. The method of claim 12, further comprising using an IO line status associated with the wakeup interrupt die number to determine when to execute the wakeup sequence and operate in a wakeup state.

14. The method of claim 12, further comprising using an IO line status associated with the sleep interrupt die number to determine when to execute the sleep sequence and operate in a sleep state.

15. The method of claim 12, further comprising placing an IO line associated with the first die is in the 1 state when data is being written to the first die and transitioning the IO line associated with the first die from the 1 state to the 0 state when a write operation on the first die completes.

16. The method of claim 12, further comprising placing the IO lines associated with other dies on the memory device are in the 0 state when data is being written to the first die.

17. The method of claim 12, further comprising moving an IO line for the first die from the 0 state to the 1 state and setting a sleep flag to false when the first processor executes the wakeup sequence.

18. The method of claim 12, wherein when an IO line for the first die moves from the 0 state to the 1 state, the method comprises determining, by a second processor in the second die, that the first die is the sleep interrupt die number for the second die and executing, by the second processor, the sleep sequence and setting a sleep flag in the second die to true.

19. A die on a memory device to execute a wakeup sequence and a sleep sequence to place the die in one of a wakeup state and a sleep state based on statuses of other dies on the memory device, the die comprises:

an input/output (IO) line to indicate an operation state of the die; and a processor to obtain a wakeup interrupt die number and a sleep interrupt die number set by a storage device communicatively coupled with the memory device, to receive a broadcast command including IO statuses for IO lines associated with the other dies on the memory device, to determine when an IO line for a second die associated with the wakeup interrupt die number transitions from a 1 state to a 0 state and execute a wakeup sequence, and to determine when an IO line for a third die associated with the sleep interrupt die number transitions from the 0 state to the 1 state and execute a sleep sequence.

20. The die of claim 19, wherein the processor sends the operation state of the die to the storage device for the storage device to broadcast the operation state of the die to the other dies on the memory device.

\* \* \* \* \*